Patented Apr. 13, 1954

2,675,399

UNITED STATES PATENT OFFICE 2,675,399

PROCESS OF PREPARING AN ALKYL OR ARYL TIN COMPOUND

Hugh E. Ramsden, Metuchen, and Carl R. Gloskey, Avenel, N. J., assignors to Metal & Thermit Corporation, New York, N. Y., a corporation of New Jersey No Drawing. Application November 20, 1952,
Serial No. 321,716

7 Claims. (Cl. 260—429)

The present invention relates to a new and improved process of preparing an alkyl or aryl tin compound utilizing a Grignard synthesis.

Organotin compounds made by the process of the present invention, may be used, for example, as intermediates in the preparation of stabilizers for organics containing chlorine and in the preparation of oil additives.

One object of the present invention is to provide a new and improved process of producing a high yield of alkyl or aryl tin compound through a Grignard synthesis.

Another object of the invention is to provide a new and improved process of producing a high yield of alkyl or aryl tin compound through a Grignard synthesis without the use of ether solvents which necessitate the use of comparatively lower temperatures to prevent their reaction with the Grignard reagent produced.

The process of the present invention is based on the reaction $$R_y SnX_{(4-y)} + nRX + nMg \rightarrow R_{(y+n)} SnX_{4-(y+n)} + nMgX_2 \quad (1)$$

wherein R is a group of the class consisting of alkyl and aryl radicals, X is a halogen, $y$ is an integer from 1 to 3, $n$ is an integer from 1 to 3 and the sum of $n$ and $y$ is 2 to 4. The reactions possible under this process are as follows:

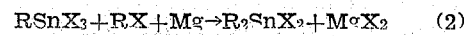
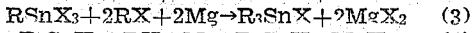
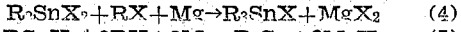
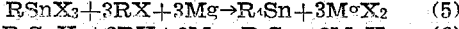
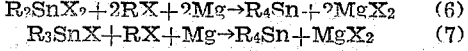

$$RSnX_3 + RX + Mg \rightarrow R_2SnX_2 + MgX_2 \quad (2)$$
$$RSnX_3 + 2RX + 2Mg \rightarrow R_3SnX + 2MgX_2 \quad (3)$$
$$R_2SnX_2 + RX + Mg \rightarrow R_3SnX + MgX_2 \quad (4)$$
$$RSnX_3 + 3RX + 3Mg \rightarrow R_4Sn + 3MgX_2 \quad (5)$$
$$R_2SnX_2 + 2RX + 2Mg \rightarrow R_4Sn + 2MgX_2 \quad (6)$$
$$R_3SnX + RX + Mg \rightarrow R_4Sn + MgX_2 \quad (7)$$

In carrying out the process of the present invention, an alkyl or aryl halide capable of reacting with magnesium in the presence of a catalyst such as ether to form a Grignard reagent and more specifically an alkyl chloride, alkyl bromide, alkyl iodide, aryl bromide or aryl iodide and the tin compound $R_y SnX_{4-y}$ are added to magnesium in the presence of a catalyst in minor proportions not sufficient to serve as the major solvent. For that purpose, the catalyst is preferably ether and is desirably present in proportions of 5 to 20 ml. per mole of halide compound. An inert hydrocarbon solvent is used such as xylene, toluene, decane, hexane or octane, and the reaction is carried out at a temperature of 65° to 185° C. and preferably between 85 to 95° C. The high temperature employed assures high conversion of the original or reactant organotin compound to the more highly alkylated or arylated tin compounds. If ether solvent were employed at this high temperature, this ether might react with the Grignard reagent produced.

The magnesium added is preferably activated as, for example, by the RX compound and/or by ethyl bromide and the proportions of the active reactants employed to produce the organotin are substantially on a stoichiometric basis, except that it may in some cases be desirable to use a small excess of the alkyl or aryl halide. The yields of this tin compound produced are high compared to those possible by other known processes. For example, a higher yield is found possible from Reaction 6 carried out under the conditions indicated above, than is obtained from the following reaction:

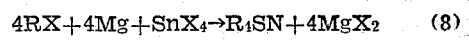

$$4RX + 4Mg + SnX_4 \rightarrow R_4Sn + 4MgX_2 \quad (8)$$

The $R_2SnX_2$ for carrying out Reaction 6 may be obtained through the following equilibration reaction

$$R_4Sn + SnX_4 \rightarrow 2R_2SnX_2 \quad (9)$$

Thus a process for the production of $R_2SnX_2$ employing $R_2SnX_2$ as a reactant could be based on the following reaction sequence

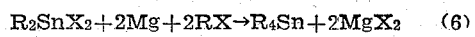

$$R_2SnX_2 + 2Mg + 2RX \rightarrow R_4Sn + 2MgX_2 \quad (6)$$
$$R_4Sn + SnX_4 \rightarrow 2R_2SnX_2 \quad (9)$$

One mole of $R_2SnX_2$ of every two moles of this compound produced in Reaction Step 9 may be taken out as a product while the other mole may be used as the starting material for the next run. Similarly, $R_4Sn$ could be manufactured by the same reactions, except that in this case half of the $R_4Sn$ produced in Reaction 6 would be taken out as product. The remainder of the $R_4Sn$ produced would be reacted with $SnX_4$ in accordance with Reaction 9, and the $R_2SnX_2$ thus produced would all be used as starting material for the next run. Since these procedures do not involve any contact between $SnX_4$ and Mg, no loss of tin is involved through the formation of $SnX_2$ and Sn by side reactions, as is possible to a minor extent with Reaction 8, and no bothersome effects are produced by the presence of the products of these side reactions and especially of $SnX_2$.

The following examples illustrate a certain way in which the principle of the invention has been applied, but it is not to be construed as limiting the broader aspects of the invention.

Example 1

A mixture comprising 1.5 ml. of ethyl bromide, 12 ml. of diethyl ether, 4.5 g. of butyl chloride and 30 ml. of toluene was blended with 24.5 g. of magnesium. The mixture was agitated rapidly and heated until an exothermic reaction started. After a period of five minutes had elapsed, a blend of 88.0 g. of butyl chloride, 250 ml. of toluene and 98.5 g. of butyl tin trichloride of 95% purity was added at a rate so that the solvent did not flood the reflux condenser employed. When the reaction appeared finished, as evidenced by the fact that no heat was being liberated, the tributyl tin chloride-tetrabutyl tin yield was isolated by dissolving the magnesium chloride in water and stripping the toluene at 760 mm. pressure. A tin and butyl balance of the experiment is tabulated below:

|  | Weight, g. | Weight, Butyl, g. | Weight, Tin, g. |
| --- | --- | --- | --- |
| Material In: |  |  |  |
| BuSnCl₃ (correct) | 94 | 19.0 | 39.5 |
| BuCl | 92.5 | 57.0 |  |
| Total |  | 76.0 | 39.5 |
| Material Out: |  |  |  |
| Bu₂SnCl₂ | 8.85 | 3.30 | 3.45 |
| Bu₃SnCl | 91.70 | 48.30 | 33.50 |
| Bu₄Sn | 7.20 | 4.73 | 2.46 |
| Total | 107.75 | 56.33 | 39.41 |

Tin Yield = 99.7%.
Butyl Yield = 74.1%.

The organotin compounds produced by this process can be separated by vacuum fractionation.

*Example 2*

| Material In | Grams | Moles |
| --- | --- | --- |
| Bu₂SnCl₂ | 151.9 (95% purity) | 0.5 (if pure). |
| BuCl | 92.5 | 1. |
| Mg | 24.4 | 1. |

Ether, 5 ml., I₂ crystal, ethyl bromide, 1 ml.
Toluene solvent.

Iodine, ether, and 5 ml. of BuCl were added to Mg. Reaction started within 9 minutes. 50 ml. toluene was then added. Solution of the Bu₂SnCl₂ in 160 ml. toluene was added. The remainder of the BuCl was diluted with 50 ml. of toluene and this solution was gradually fed to the reaction. Heat was applied to the flask intermittently so that observations as to the rate of heat evolution by the reaction could be made. When about one-third of the BuCl had been added in the course of about 1 hour, the temperature had been brought to about 95° C.; 1 ml. of ethyl bromide was added and then the addition of butyl chloride was resumed. About 2 hours was taken to feed the final two-thirds of the butyl chloride to the reaction flask. The ethyl bromide appeared to stimulate the reaction so that more heat was evolved after it had been added. After all the butyl chloride had been introduced, the reaction mixture was kept at reflux temperature for several hours to insure complete reaction. The mixture was treated with a small amount of ethyl alcohol and finally with 100 ml. of dilute hydrochloric acid (90 ml. H₂O, 10 ml. 12N HCl). There were now formed two layers which were separated in a separatory funnel. The aqueous layer was extracted with 100 ml. toluene and then with 100 ml. petroleum ether. The extracts were added to the organic layer which was then stripped of solvents and distilled under vacuum. The organotin product recovered in this way weighed 156.3 grams. Analysis showed it to contain about .3 gm. of Bu₂SnCl₂, 77.2 gms. of Bu₃SnCl and 72.0 gms. of Bu₄Sn for a total of 149.5 gms. of organotin products. The indicated yield of tin was about 90%, of butyl group about 80%.

What is claimed is:

1. The method of producing an organotin compound which comprises carrying out in one step the following reaction $$R_ySnX_{(4-y)} + nRX + nMg \rightarrow R_{(y+n)}SnX_{4-(y+n)} + nMgX_2$$

wherein R is a group of the class consisting of alkyl and aryl radicals, X is a halogen, y is an integer from 1 to 3, n is an integer from 1 to 3 and the sum of n and y is 2 to 4.

2. The method of producing an organotin compound comprising reacting in one step the compound RX of the class consisting of an alkyl chloride, alkyl bromide, alkyl iodide, aryl bromide and aryl iodide with magnesium and with the compound $R_ySnX_{4-y}$, wherein R is a group of the class consisting of an alkyl and an aryl radical, X is the same halogen that appears in the RX compound and y is an integer from 1 to 3, in the presence of an inert hydrocarbon and in the presence of a catalyst in minor proportions, not sufficient to serve as the major solvent.

3. The method of producing an organotin compound comprising activating magnesium to render it reactive and reacting said magnesium in one step with a compound RX, wherein R is a group of the class consisting of alkyl and aryl radicals, X is a halogen of the class consisting of chlorine, bromine and iodine, and with a compound $R_ySnX_{4-y}$, wherein R is a group of the class consisting of an alkyl and aryl radical, and X is a halogen of the class consisting of chlorine, bromine and iodine and y is an integer from 1 to 3, in the presence of an inert hydrocarbon solvent and in the presence of an ether in minor catalyzing proportions not sufficient to serve as the major solvent.

4. The method of producing an organotin compound which comprises carrying out in one step the following reaction $$R_ySnX_{(4-y)} + nRX + nMg \rightarrow R_{(y+n)}SnX_{4-(y+n)} + nMgX_2$$

wherein R is a group of the class consisting of alkyl and aryl radicals, X is a halogen of the class consisting of chlorine, bromine and iodine, y is an integer from 1 to 3, n is an integer from 1 to 3 and the sum of n and y is 2 to 4, in the presence of ether in minor catalyzing proportion not sufficient to serve as the major solvent and in the presence of an inert hydrocarbon in major proportions to serve as the major solvent.

5. The method of producing an organotin compound as described in claim 4, wherein the reaction is carried out at a temperature of between 65 and 185° C.

6. The method of producing an organotin compound as described in claim 6 wherein the inert hydrocarbon is of the class consisting of toluene, xylene, decane, hexane and octane.

7. The method of producing an organotin compound which comprises carrying on the reactions $$R_2SnX_2 + 2Mg + 2RX \rightarrow R_4Sn + 2MgX_2 \quad (1)$$

$$R_4Sn + SnX_4 \rightarrow 2R_2SnX_2 \quad (2)$$

wherein R is a group of the class consisting of alkyl and aryl radicals, and X is a halogen and employing about one-half of the R₂SnCl₂ produced in Reaction 2 as the starting material for the next run of Reaction 1, Reaction 1 being carried out in one step.

References Cited in the file of this patent

Goddard, Text Book of Inorganic Chemistry, vol. XI, part I, pages 302-303 (1928).

Krause et al., Die Chemie der metal-organischen Verbindungen (1937), pages 312-314 and 335.

Gilman, Organic Chemistry, vol. 1, page 496 (1943).